United States Patent [19]

Hirakawa et al.

[11] Patent Number: 5,516,159
[45] Date of Patent: May 14, 1996

[54] QUARTZ PIPE JOINT

[75] Inventors: Nobuhito Hirakawa, Amagasaki; Kiyoshi Nishio, Takarazuka, both of Japan

[73] Assignee: Nippon Pillar Packing Co., Ltd., Osaka, Japan

[21] Appl. No.: 219,178

[22] Filed: Mar. 28, 1994

[51] Int. Cl.⁶ .................................................. F16L 21/02
[52] U.S. Cl. .......................... 285/388; 285/911; 285/173; 285/342
[58] Field of Search .................... 285/242, 317, 285/388, 911, 339, 334.4, 334.3, 342, 343, 389, 387, 169, 173, 423

[56] References Cited

U.S. PATENT DOCUMENTS

| | | | |
|---|---|---|---|
| 1,450,606 | 4/1923 | Paine | 285/388 |
| 2,298,117 | 10/1942 | Franck | 285/388 |
| 2,791,452 | 5/1957 | Watson | 285/342 |
| 3,326,583 | 6/1976 | Guarnaschelli | 285/342 |
| 3,441,297 | 4/1969 | Koski | 285/342 |
| 3,544,281 | 12/1970 | Phillips | 285/911 |
| 4,135,866 | 1/1979 | Winkler | 285/911 |
| 4,278,276 | 7/1981 | Elkman | 285/388 |
| 4,309,050 | 1/1982 | Legris | 285/342 |
| 4,877,270 | 10/1989 | Phillips | 285/911 |
| 5,154,453 | 10/1992 | Nishio | 285/342 |

FOREIGN PATENT DOCUMENTS

| | | | |
|---|---|---|---|
| 1559453 | 1/1980 | United Kingdom | 285/911 |
| 2116275 | 9/1983 | United Kingdom | 285/388 |

Primary Examiner—Eric K. Nicholson
Attorney, Agent, or Firm—Jones, Tullar & Cooper

[57] ABSTRACT

A quartz pipe joint of the present invention can be used in a connection of, for example, a quartz pipe and a quartz pipe, or a quartz pipe 7 and a synthetic resin tube. The quartz pipe joint A has a joint body having a tapered pressing face a cylindrical sealing member 33 having a tapered receiving face 33, a lock ring which can deform to increase its diameter and deform to reduce its diameter and which can be fitted into an annular groove of the quartz pipe and a nut. When the lock ring fitted into the annular groove and the sealing member fitted into the quartz pipe are clamped by threadedly connecting the nut to the joint body, the sealing member is deformed to reduce its diameter by the function of the pressing face and the receiving face, so as to closely contact with the outer peripheral face of the quartz pipe, thereby exerting sealing properties. The lock ring engages with a groove wall of the annular groove to prevent the quartz pipe from slipping off from the joint.

7 Claims, 12 Drawing Sheets

QUARTZ PIPE JOINT

BACKGROUND OF THE INVENTION

1. Field of the Invention

The present invention relates to a pipe joint for a quartz pipe (hereinafter, referred to as "quartz pipe joint") which can be used in a connection for a quartz tank of an apparatus for cleaning a silicon wafer and a chemical distribution system, or in a chemical distribution system of a semiconductor production line, a system relating to a liquid crystal device, etc.

An example of a pipe joint of this kind is a pipe joint disclosed in Japanese Patent Publication (Kokoku) No. HEI1-54,599. With reference to FIG. 12, the pipe joint 100 will be described. In the pipe joint 100, a nut 110 and a seal fastening ring 120 are fitted onto a synthetic resin tube 200 in this sequence, and an end 201 of the synthetic resin tube 200 is then inserted into a pipe receiving portion 131 of a joint body 130. The nut 110 is loosely threadedly connected with the joint body 130, and then tightly fastened so that the fastening ring 120 is clamped between a tapered pressing face 132 of the joint body 130 and the nut 110. The reference numeral 121 designates a tapered receiving face which corresponds to the pressing face 132 of the joint body 130. The receiving face 121 is formed on the fastening ring 120.

In the pipe joint 100, the fastening ring 120 clamped between the pressing face 132 of the joint body 130 and the nut 110 is deformed to reduce its diameter in opposition to the elasticity of the material of the fastening ring 120. The fastening ring 120 which is deformed to reduce its diameter in this way "bites" the synthetic resin tube 200, thereby preventing the synthetic resin tube 200 from slipping out from the pipe joint.

2. Description of the Prior Art

In the pipe joint 100 shown in FIG. 12, the fastening ring 120 performs the sealing function of sealing the connection of the pipe joint 100 and the synthetic resin tube 200 to eliminate leakage of fluid, and also preforms the slipping-out preventing function of tightly fastening the synthetic resin tube 200 to prevent it from slipping out from the pipe joint.

In the pipe joint 100 shown in FIG. 12, however, when the fluid pressure applied to the pipe joint during actual use exceeds a certain limit, the biting portion (fastening portion) of the synthetic resin tube 200 at which the fastening ring 120 "bites" is deformed so that the tube easily slips out from the pipe joint. In the case where the fluid temperature is high, whether or not the fluid pressure exceeds the limit, that portion of the synthetic resin tube 200 is softened so that the tube easily slips out from the pipe joint. As the bore diameter of the synthetic resin tube 200 is increased, the stress relaxation occurs more easily at that portion of the synthetic resin tube 200, resulting in the synthetic resin tube 200 easily slipping out from the pipe joint 100. Because of these disadvantages due to the fluid pressure, the fluid temperature, the bore diameter, etc., the application of the pipe joint 100 shown in FIG. 12 is restricted to a narrow range.

On the other hand, in a chemical distribution system used in an apparatus for cleaning a silicon wafer, a semiconductor production line, a system relating to a liquid crystal device, etc., pipes for distributing chemicals are required to have highly excellent chemical resistance properties, pressure tightness, heat resistance, and the like. From this point of view, quartz pipes are preferably used as a piping member. A quartz pipe has excellent chemical resistance, and properties that make it difficult to be adversely affected by a variation of fluid pressure or fluid temperature. When a quartz pipe is used in place of the synthetic resin tube 200 shown in FIG. 12, therefore, the stress relaxation due to the effects of fluid pressure, fluid temperature, the size of the bore diameter, etc. hardly occurs at the portion where the fastening ring 120 exerts a fastening force, thereby reducing the possibility that the quartz pipe is caused to easily slip out from the pipe joint 100 by such effects.

When a quartz pipe is used in place of the synthetic resin tube 200, however, there arises another problem as follows: A quartz pipe has a property that it is hard to deform to reduce its diameter. Even if the nut 110 is tightly fastened using a tool such as a spanner, therefore, the slipping-out preventing function of the fastening ring 120 is not improved proportionally to the increase in the fastening force.

SUMMARY OF THE INVENTION

The present invention was developed in view of the aforementioned circumstances.

It is an object of the present invention to provide a quartz pipe joint which, when connected to a quartz pipe, possesses an excellent sealing function and slipping-out preventing function, and which is excellent in safety and reliability.

It is another object of the present invention to provide a quartz pipe joint which, when connected to a quartz pipe, possesses an excellent slipping-out preventing function while a sealing member exhibits only a sealing function.

It is a further object of the present invention to provide a quartz pipe joint which possesses excellent chemical resistance, pressure tightness, heat resistance, and the like.

It is a still further object of the present invention to provide a quartz pipe joint in which a sealing member possesses an excellent sealing function even when a nut exerts a fastening force on a joint body that is not very large.

It is a still further object of the present invention to provide a quartz pipe joint in which a sealing function of a sealing member is hardly impaired even when an excessively large force is applied to the sealing member.

It is a still further object of the present invention to provide a quartz pipe joint in which, while a sealing member fastens a quartz pipe to exert a sealing function, there is less possibility that the quartz pipe is damaged by the fastening force applied to the quartz pipe.

It is a still further object of the present invention to provide a quartz pipe joint which exerts a slipping-out preventing force of a level that exceeds the breaking strength of a quartz pipe.

It is a still further object of the present invention to provide a quartz pipe joint in which, when a lock ring is attached to a quartz pipe to prevent the quartz pipe from slipping out, the lock ring can be held by a nut so that the ring is prevented from coming out from the quartz pipe.

In order to attain the above-mentioned objects, a quartz pipe joint according to the present invention comprises:

a joint body having a pipe receiving portion into which a quartz pipe is to be inserted;

a cylindrical sealing member which is to be externally fitted onto the quartz pipe, thereby causing an inner peripheral face of the sealing member to closely contact with an outer peripheral face of the quartz pipe;

a tapered receiving face which has a diameter gradually decreasing toward a front end and which is formed on one end face of the sealing member;

an outwardly expanding tapered pressing face which is disposed in the pipe receiving portion of the joint body, the pressing face overlapping the receiving face of the sealing member which is externally fitted onto the quartz pipe;

a lock ring which can deform to increase in diameter and deform to reduce its diameter, the ring being able to be fitted into an annular groove which is formed on an outer periphery of the quartz pipe at a predetermined location in an axial direction, an inner periphery portion of the ring being able to engage in the axial direction with a groove wall of the annular groove under a state in which the ring is fitted into the annular groove;

a nut which is to be externally fitted onto the quartz pipe and threadedly connected to the joint body; and a pressing piece which is disposed in the nut, the pressing piece cooperating with a pressing face of the joint body to, when the nut is threadedly connected to the joint body, clamp in the axial direction the lock ring which is fitted into the annular groove of the quartz pipe, and the sealing member which is externally fitted onto the quartz pipe.

In the thus configured quartz pipe joint of the present invention, the nut is threadedly connected to the joint body so that the pressing piece of the nut cooperates with the pressing face of the joint body, whereby the lock ring which is fitted into the annular groove of the quartz pipe, and the sealing member which is externally fitted onto the quartz pipe are clamped in the axial direction. Therefore, the receiving face of the sealing member is pushed inwardly in the radial direction by the pressing face of the joint body so that the sealing member is deformed to reduce its diameter. Consequently, the inner peripheral face of the sealing member is closely contacted with the outer peripheral face of the quartz pipe by a force which corresponds to the force of threadedly contacting the nut and the joint body with each other, thereby accomplishing a seal. When the inner peripheral face of the sealing member is formed as a cylindrical face, the sealing properties are hardly impaired even when the force of threadedly contacting the nut and the joint body with each other becomes excessive. When the quartz pipe is disposed to be pulled out, the inner periphery portion of the lock ring engages with the groove wall of the annular groove of the quartz pipe, thereby preventing the quartz pipe from slipping out from the joint. The slipping-out preventing function exerted by the lock ring is more remarkable in the configuration where C<A<D, with C being an outer diameter of a bottom face of the annular groove of the quartz pipe, A being the inner diameter of the lock nut, and D being the outer diameter of the quartz pipe. According to the configuration wherein the joint body, the sealing member, the nut and the locking ring are made of synthetic resin it is possible to provide, a quartz pipe joint which hardly injures or damages a quartz pipe. According to the configuration wherein, in a natural state, the lock ring has an outer diameter at which the ring fitted into the nut is disabled from deforming to increase a diameter the lock ring attached to a quartz pipe is threadedly connects the nut to the lock ring attached to the quartz pipe. Even when the lock ring is not threadedly connected to the joint body, therefore, the lock ring is held by the nut so that the lock ring is prevented from coming out from the quartz pipe. Consequently, such a quartz pipe joint can further enhance safety.

Another quartz pipe joint according to the present invention comprises:

a joint body having a pipe receiving portion into which a quartz pipe is to be inserted;

a cylindrical sealing member which is to be externally fitted onto the quartz pipe, thereby causing an inner peripheral face of the sealing member to closely contact with an outer peripheral face of the quartz pipe;

a tapered receiving face which has a diameter gradually decreasing toward a front end and which is formed on one end face of the sealing member;

a outwardly expanding tapered pressing face which is disposed in the pipe receiving portion of the joint body, the pressing face overlapping the receiving face of the sealing member which is externally fitted onto the quartz pipe;

a lock ring which can deform to increase in diameter and deform to reduce its diameter, the ring being able to be fitted into an annular groove which is formed on an outer periphery of the quartz pipe at a predetermined location in an axial direction, an inner periphery portion of the ring being able to engage in the axial direction with a groove wall of the annular groove under a state in which the ring is fitted into the annular groove;

a nut which is to be externally fitted onto the quartz pipe and threadedly connected to the joint body;

a pressing piece which is disposed in the nut, the pressing piece cooperating with a pressing face of the joint body to, when the nut is threadedly connected to the joint body, clamp in the axial direction the lock ring which is fitted into the annular groove of the quartz pipe, and the sealing member which is externally fitted onto the quartz pipe; and an outwardly expanding tapered face which is formed on an inner peripheral portion of the other end face of the sealing member, the tapered face surrounding the groove wall of the annular groove of the quartz pipe when the sealing member is clamped together with the lock ring by the pressing face of the joint body and the pressing piece of the nut, whereby the inner peripheral face of the sealing member is closely contacted with the outer peripheral face of the quartz pipe at a position which is separated from the annular groove.

In the other quartz pipe joint of the present invention having such a configuration, the outwardly expanding tapered face which is formed on the sealing member is useful to cause the inner peripheral face of the sealing member to be closely contacted with the outer peripheral face of the quartz pipe at a position which is separated from the annular groove. Therefore, the fastening force exerted on the quartz pipe by the sealing member is hardly concentrated in the vicinity of the annular groove of the quartz pipe, whereby the vicinity of the annular groove of the quartz pipe is prevented from being damaged by stress concentration. Further, since the area of the portion of the inner peripheral face contacting with the outer peripheral face of the quartz pipe is small for the length of the sealing member in the axial direction, a large contact pressure can be obtained even when the force of threadedly connecting the nut to the joint body is small. Consequently, excellent sealing properties can be obtained by a small fastening force, and the quartz pipe is hardly damaged. According to the configuration wherein an outer peripheral face of the sealing member is formed as a tapered face in which an inclination angle with respect to an axis is smaller than that of the tapered receiving face of the sealing member, the diameter of which is gradually reduced toward the receiving face, and the smallest diameter portion contacts with the receiving face; or wherein, when an inclination angle of the tapered outer peripheral face disposed on the outer peripheral face of the sealing member, with respect to the axis is indicated by $\alpha$, and an inclination angle of the tapered receiving face of the sealing member with respect to the axis is indicated by $\beta$, the relationship:

$$3° < \beta - \alpha < 10°$$

is satisfied and the sealing member can easily deform to reduce its diameter.

A further quartz pipe joint according to the present invention comprises:

a joint body having a pipe receiving portion into which a quartz pipe is to be inserted;

a ring-like sealing member which is held at the pipe receiving portion of the joint body and which is closely contacted with an outer peripheral face of the quartz pipe;

a lock ring which can deform to increase in diameter and deform to reduce its diameter, the ring being able to be fitted into an annular groove which is formed on an outer periphery of the quartz pipe at a predetermined location in an axial direction, an inner periphery portion of the ring being able to engage in the axial direction with a groove wall of the annular groove under a state in which the ring is fitted into the annular groove;

a nut which is to be externally fitted onto the quartz pipe and threadedly connected to the joint body; and a pressing piece which is disposed in the nut, the pressing piece cooperating with a pressing face of the joint body to, when the nut is threadedly connected to the joint body, clamp in the axial direction the lock ring which is fitted into the annular groove of the quartz pipe.

In the further quartz pipe joint of the present invention having such a configuration, a synthetic resin O-ring which is versatile and inexpensive can be used as the sealing member. The slipping-out preventing function of the quartz pipe is exerted by the lock ring in the same manner as the invention described above.

These and other features, objects and advantages of the present invention will be more fully apparent from the following description of embodiments thereof.

DETAILED DESCRIPTION OF THE PREFERRED EMBODIMENTS

Figure 1:
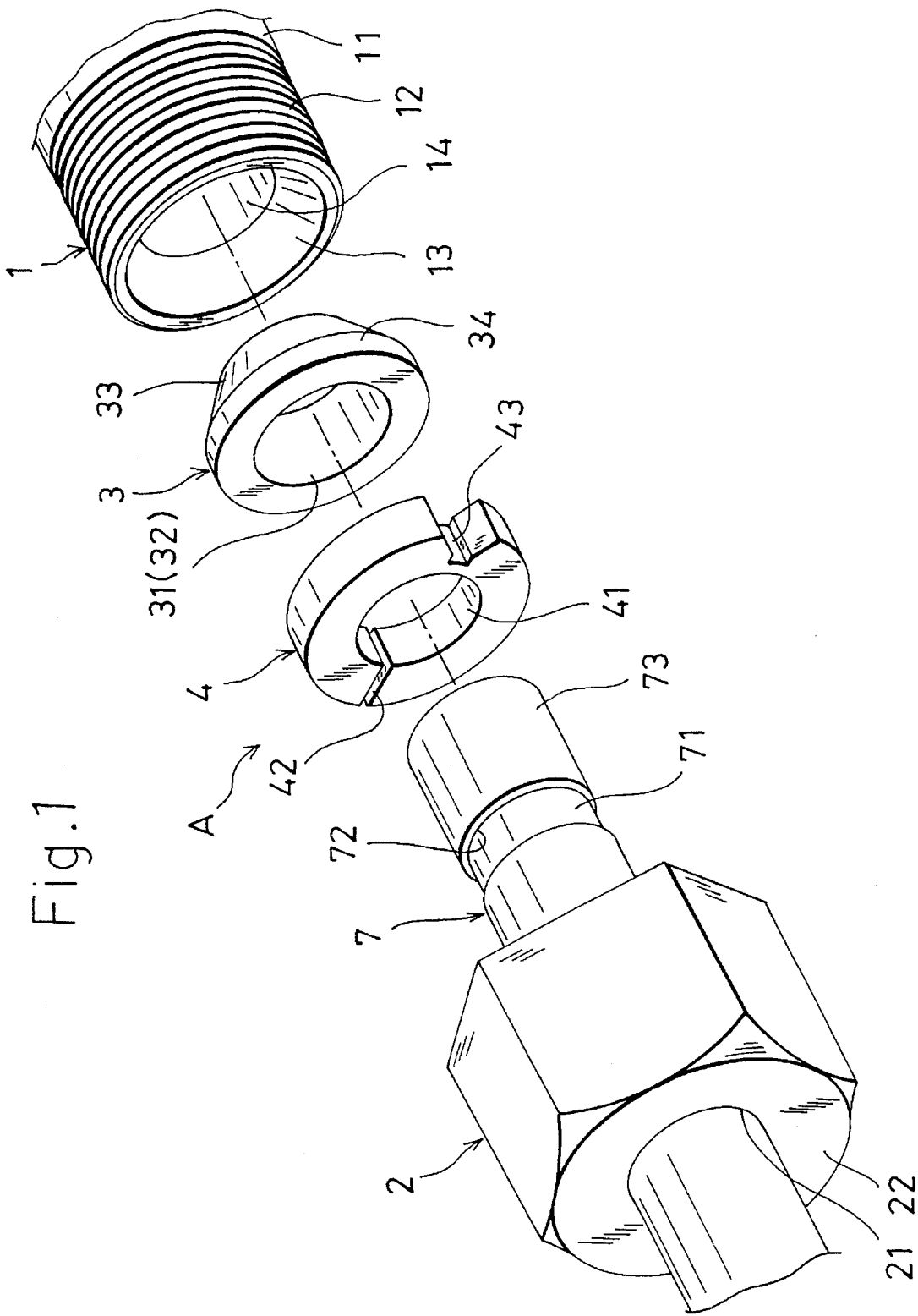
FIG. 1 is an exploded perspective view showing a quartz pipe joint according to an embodiment which is used to connect a quartz pipe to a synthetic resin tube.
Figure 2:
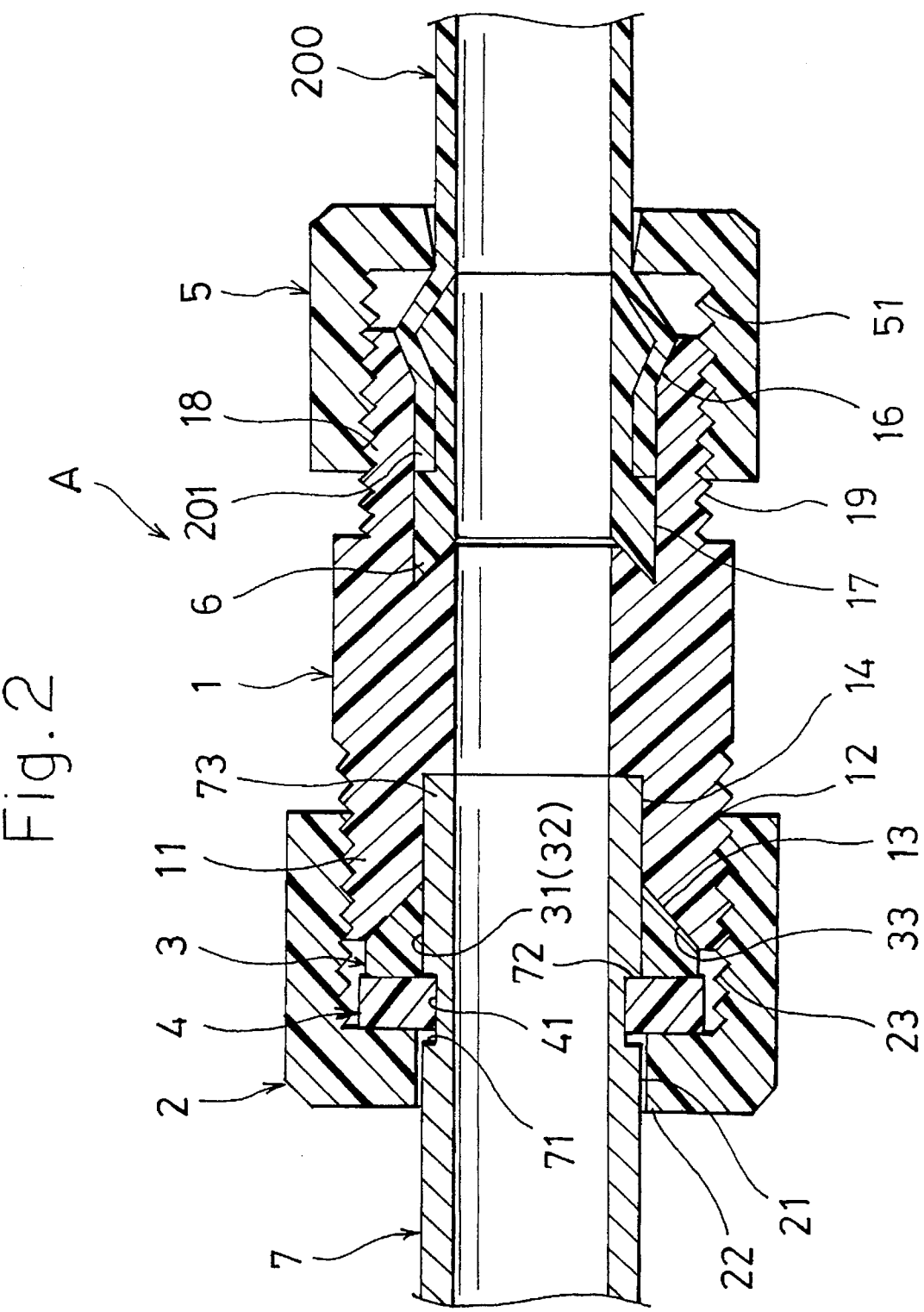
FIG. 2 is a vertical section view showing a use state of the quartz pipe joint.

As shown in FIGS. 1 and 2, a quartz pipe joint A of an embodiment comprises a joint body 1, a first nut 2, a sealing member 3, a lock ring 4, a second nut 5, and a sleeve 6.

The joint body 1 is cylindrical and has a pipe receiving portion 11 at one end thereof. The pipe receiving portion 11 has an insertion recess 14 which is coincident in shape and dimension with an end 73 of a quartz pipe 7. The inner periphery portion of the receiving portion 11 is formed as an outwardly expanding tapered pressing face 13 in which the diameter gradually increases from the inside of the pipe receiving portion 11 to the outside thereof. The joint body 1 has at the other end thereof a pipe receiving portion 18 to which a synthetic resin tube 200 is to be connected. On the inner periphery portion of the pipe receiving portion 18 at the other end, an insertion recess 17 is formed into which an end 201 of the synthetic resin tube 200 is to be inserted. A pressing face 16 the diameter of which gradually increases from the inside to the outside is formed on the insertion recess 17. External thread portions 12 and 19 are formed on the ends of pipe receiving portions 11 and 18 respectively.

A pressing piece 22 having a hole 21 through which the quartz pipe 7 can pass is integrated with the first nut 2. The first nut 2 is provided with an internal thread portion 23 which can be threadedly connected to the external thread portion 12 of the joint body 1. The synthetic resin tube 200 can pass through the second nut 5. The second nut 5 is provided with an internal thread portion 51 which can be threadedly connected to the external thread portion 19 of the joint body 1.

The sealing member 3 is provided with a hole 32 having a diameter which is slightly greater than the outer diameter of the quartz pipe 7. The sealing member 3 is provided also with a tapered receiving face 33 having a diameter which gradually decreases in the direction of inserting the quartz pipe 7 (hereinafter, a tapered receiving face having such a decreasing diameter is often referred to as merely "tapered receiving face"). The inclination angle of the receiving face 33 with respect to the axis is equal to that of the pressing face 13 of the joint body 1, and the receiving face 33 and the pressing face 13 are coincident in shape and dimension with each other. Therefore, both faces can overlap each other. The outer peripheral face 34 of the sealing member 3 is formed as a cylindrical face which is parallel to the inner peripheral face 31 surrounding the hole 32.

The lock ring 4 has a hole 41 which is coincident in shape and dimension with an annular groove 71 formed on the outer periphery of the quartz pipe 7 at the predetermined position along the axial direction, and a splitting groove 42 which is formed by dividing the ring 4 at one portion along the peripheral direction. The lock ring 4 further has a thin portion 43 formed by partly removing a portion of the outer periphery which portion is opposite to the splitting groove 42. Because of the elasticity of the material constituting the thin portion 43, the lock ring 4 having this configuration can be deformed to increase its diameter to a value which is greater than the outer diameter of the quartz pipe 7. In contrast, the lock ring 4 can be deformed to reduce its diameter to a value at which the opening of the splitting groove 42 disappears. When the lock ring 4 is in the natural state, the inner diameter of the ring 4 is smaller than the outer diameter of the quartz pipe 7. Under the state where the lock ring 4 is fitted into the annular groove 71, therefore, the inner periphery portion of the ring 4 is confronted with a groove wall 72 of the annular groove 71 so as to be engaged with the annular groove 71.

When the quartz pipe joint A is to be used in a piping system for transporting chemicals of strong acid, strong alkali, or the like, it is preferable to construct the components of the quartz pipe joint A, i.e., the joint body 1, the first nut 2, the sealing member 3, the lock ring 4, the second nut 5, and the sleeve 6, of a material which can resist strong acid, strong alkali, or the like. Examples of materials having excellent chemical resistance, heat resistance, and pressure tightness properties are synthetic resins such as PTFE, and PFA. Also in the embodiment, the joint body 1, and the sealing member 3 are made of PTFE, or PFA.

Next, an example of the procedure for connecting the quartz pipe 7 to the synthetic resin tube 200 using the quartz pipe joint A will be described.

As inferred from FIGS. 1 and 2, when the quartz pipe joint A and the quartz pipe 7 are to be connected to each other, the following occurs: The first nut 2 is externally fitted onto a portion of the quartz pipe 7 which portion is located more inwardly than the annular groove 71. The lock ring 4 is deformed to increase its diameter to be fitted onto the quartz pipe 7, and then fitted into the annular groove 71 of the quartz pipe 7 so that the ring 4 returns to its natural state, whereby the ring 4 is fittingly fixed to the annular groove 71. The sealing member 3 is fitted onto the end 73 of the quartz pipe 7 and moved to a position at which the sealing member 3 contacts with the lock ring 4. Thereafter, the end 73 of the quartz pipe 7 is deeply inserted into the insertion recess 14 of the pipe receiving portion 11 in the one end side of the joint body 1, so that the pressing face 13 of the joint body 1 contacts with the receiving face 33 of the sealing member 3. Then, the external thread portion 12 of the joint body 1 is threadedly connected to the internal thread portion 23 of the first nut 2, and fastened. For example, this fastening operation may be conducted as follows: Initially, the first nut 2 is turned by hand. After the nut cannot be turned further by hand, it is turned by a specified number of turns using a tool such as a spanner to be tightly fastened. When the first nut 2 is fastened, the pressing piece 22 of the first nut 2 cooperates with the pressing face 13 of the joint body 1 to tightly clamp the lock ring 4 and the sealing member 3 in the axial direction. Accordingly, as the fastening due to the first nut 2 proceeds, the receiving face 33 of the sealing member 3 is pushed against the pressing face 13 of the joint body 1 so that the sealing member 3 is forcibly deformed to reduce its diameter in opposition to the elasticity of the material, whereby the inner peripheral face 31 of the sealing member 3 closely contacts with the outer peripheral face of the quartz pipe 7. This causes the pressing face 13 of the joint body 1 and the receiving face 33 of the sealing member 3 to closely contact with each other in an air-tight or liquid-tight manner, and the outer peripheral face of the quartz pipe 7 and the inner peripheral face 31 of the sealing member 3 to closely contact with each other in an air-tight or liquid-tight manner, whereby the pipe receiving portion 11 of the joint body 1 is connected to the quartz pipe 7 while accomplishing a seal in an air-tight or liquid-tight manner. When the quartz pipe 7 is pulled in the pull out direction by an external force acting on the quartz pipe 7 or the quartz pipe joint A so that the quartz pipe 7 is moved or disposed to be moved in the pull out direction, the inner periphery portion of the lock ring 4 backed up by the pressing piece 22 of the first nut 2 engages with the groove wall 72 of the annular groove 71 of the quartz pipe 7, thereby preventing the quartz pipe 7 from slipping out from the joint.

When the quartz pipe joint A and the synthetic resin tube 200 are to be connected to each other, the following occurs: The sleeve 6 is fitted into the end 201 of the synthetic resin tube 200, and the second nut 5 is externally fitted onto the end 201 of the synthetic resin tube 200. Thereafter, the end 201 of the synthetic resin tube 200 is inserted into the insertion recess 17 of the pipe receiving portion 18 in the other end side of the joint body 1. Then, the external thread portion 19 of the pipe receiving portion 18 of the joint body 1 is threadedly connected to the internal thread portion 51 of the second nut 5, and fastened. This fastening operation is conducted as follows: Initially, the second nut 5 is turned by hand (hand fastening). After the nut cannot be turned further by hand, it is turned by a specified number of turns using a tool such as a spanner to be tightly fastened. This causes the other-end pipe receiving portion 18 of the joint body 1 to be connected to the synthetic resin tube 200 in an air-tight or liquid-tight manner.

Next, a heat cycle test conducted on the quartz pipe joint A shown in FIGS. 1 and 2 will be described with reference to FIGS. 9 to 11. In the heat cycle test, four quartz pipe joints for the connection of a quartz pipe having a pipe diameter of 19 mm were used as samples Nos. 1 to 4, and four quartz pipe joints for the connection of a quartz pipe having a pipe diameter of 8 mm were used as samples Nos. 5 to 8. The samples of the quartz pipe joints were connected to quartz pipes and synthetic resin tubes in the manner described in conjunction with FIG. 2. In the fastening operation which was conducted using a tool such as a spanner after the hand-fastening of the first and second nuts 2 and 5, the nuts 2 and 5 were turned by ½ turn.

Figure 9:
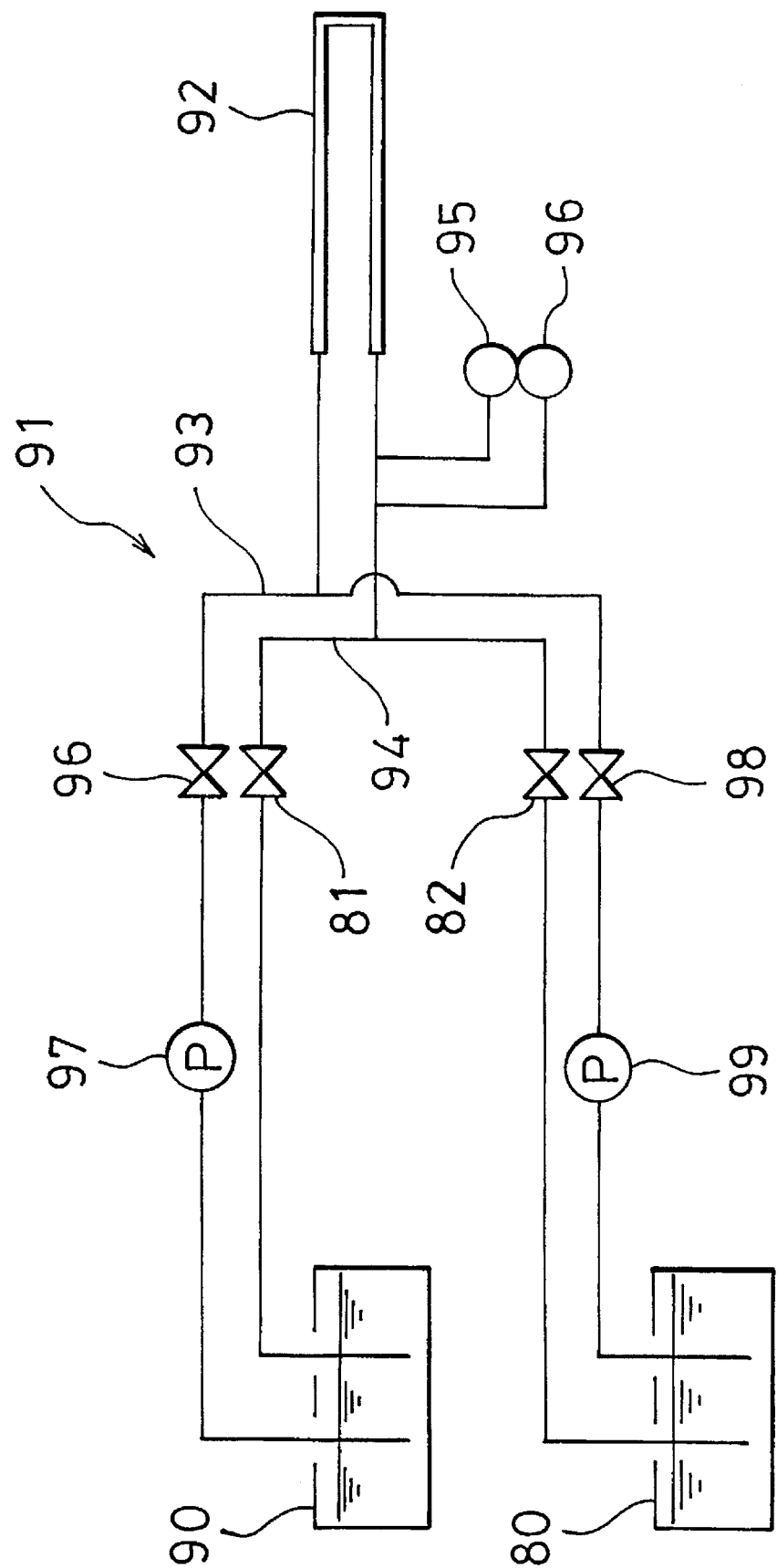
FIG. 9 is a diagram of a heat cycle testing apparatus and showing a method of testing the quartz pipe joint of FIG. 1.
Figure 10:
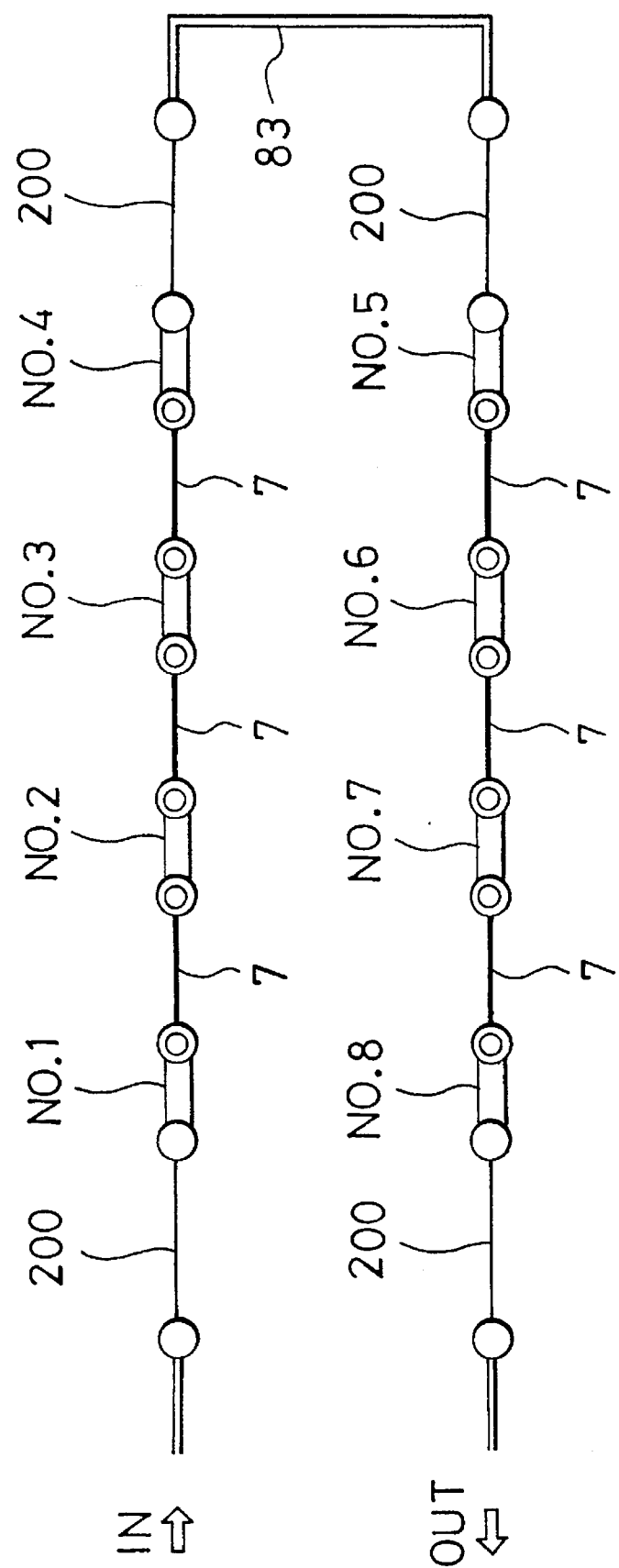
FIG. 10 is a piping diagram showing, in an enlarged manner, a test path use in the heat cycle testing apparatus of FIG. 9.
Figure 11:
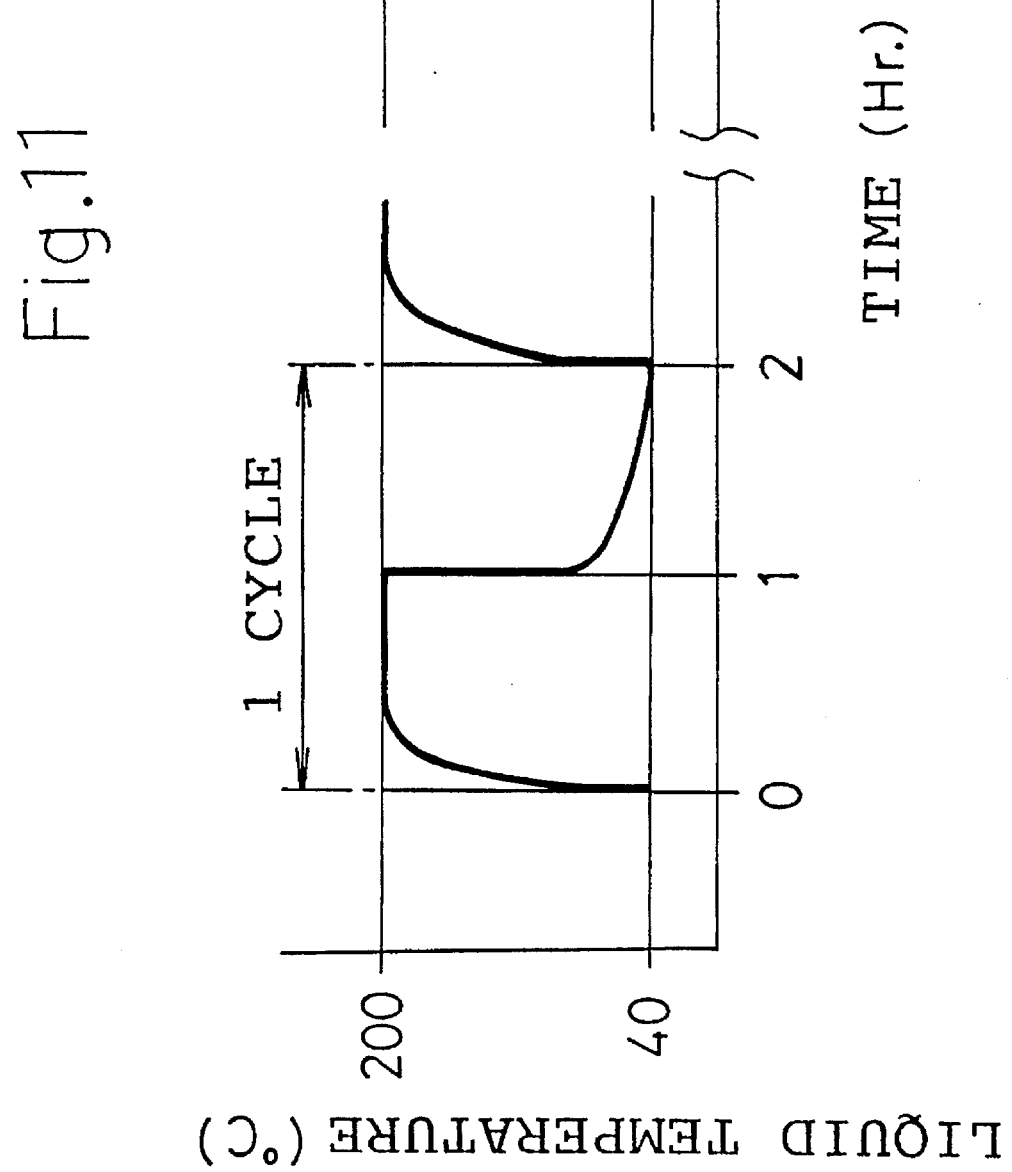
FIG. 11 is a time chart showing temperature conditions of the heat cycle conducted in the heat cycle testing apparatus of FIG. 9.
Figure 12:
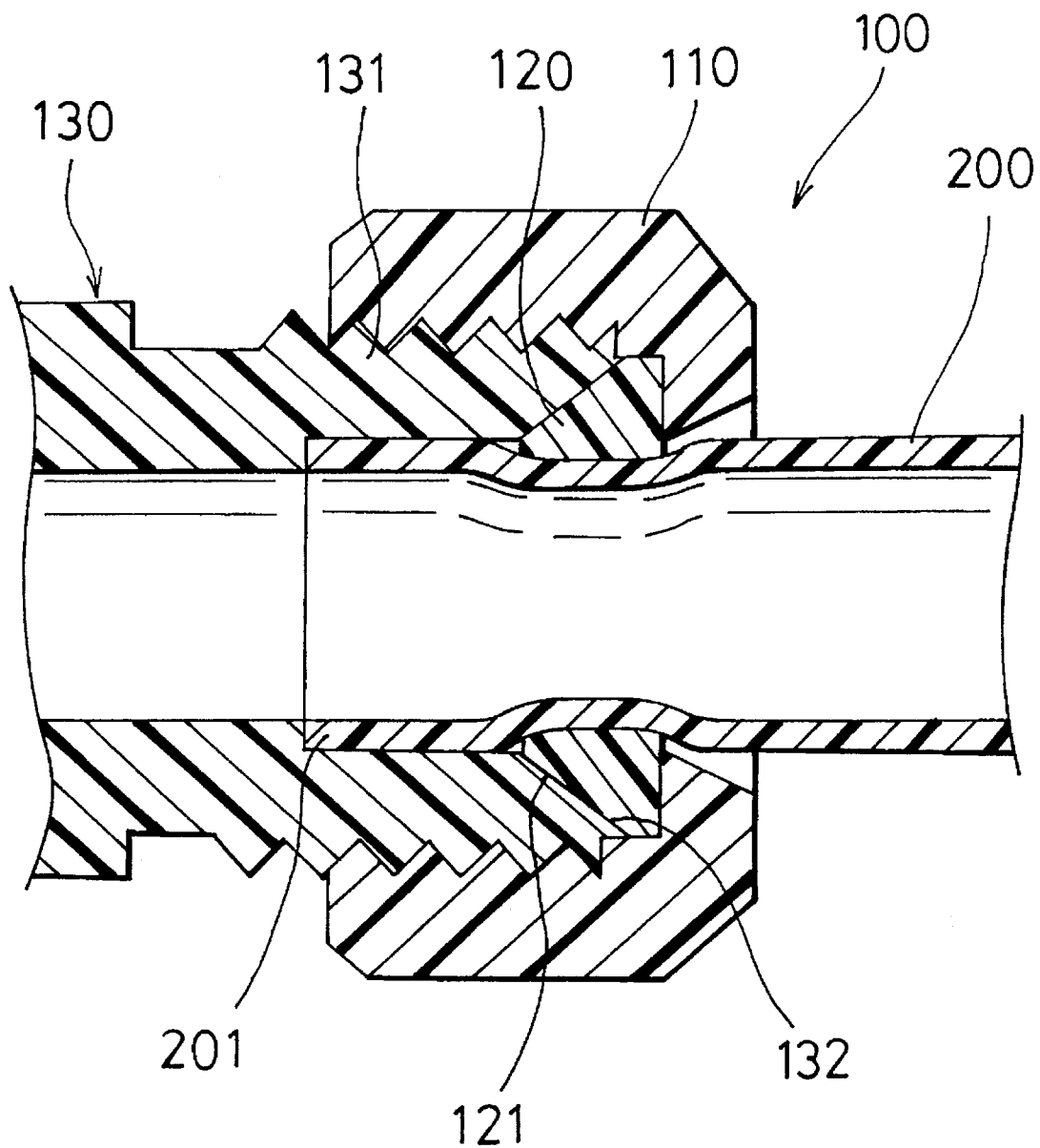
FIG. 12 is a vertical section view showing a use state of a prior art pipe joint.

FIG. 9 shows a configuration of a heat cycle testing apparatus 91, and FIG. 10 shows in detail a test path 92 of the heat cycle testing apparatus 91.

As shown in FIG. 9, one end of the test path 92 of the heat cycle testing apparatus 91 is connected to a middle portion of a first oil circulating path 93, and the other end is connected to a middle portion of a second oil circulating path 94. A thermometer 95 and a pressure gauge 96 are connected to an oil recovery side of the test path 92. One end of the first oil circulating path 93 is connected to an outlet of a high temperature tank 90 via a switching valve 96 and a supply pump 97, and the other end of the oil circulating path 93 is connected to an outlet of a low temperature tank 80 via a switching valve 98 and a supply pump 99. One end of the second oil circulating path 94 is connected to an inlet of the high temperature tank 90 via a switching valve 81, and the other end of the oil circulating path 94 is connected to an inlet of the low temperature tank 80 via a switching valve 82.

As shown in FIG. 10, samples Nos. 1 to 4 and samples Nos. 5 to 8 are connected to each other via quartz pipes 7. Samples Nos. 4 and 5 are connected to each other via a metal pipe 83 made of SUS and synthetic resin tubes 200 which are respectively connected to the ends of the metal pipe 83. Samples Nos. 1 and 8 are connected to synthetic resin tubes 200 which are in turn connected as shown in FIG. 9 to the first and second oil circulating paths 93 and 94, respectively. In each of samples Nos. 1 to 4 and Nos. 5 to 8, the structures of the portions for connecting the quartz pipes 7 and the synthetic resin tubes 200 are the same as those shown in FIG. 2.

In the heat cycle testing apparatus 91, the switching valves 81 and 96 for circulating high temperature oil, and the switching valves 82 and 98 for circulating low temperature oil were alternatingly opened and closed so that silicone oil of 200° C. and stored in the high temperature tank 90 was circulated in the test path 92 for one hour, and silicone oil of an ordinary temperature and stored in the low temperature tank 80 was circulated in the test path 92 for the next one hour. This process was set to be one cycle (two hours). In the test, the process was repeated 100 cycles (200 hours). FIG. 11 shows the relationship between the testing period and the temperature of the fluid in the test path 92, in a partially omitted manner.

In the heat cycle test, silicone oil (KF968) was used as the transporting fluid for testing, the oil pressure in the periods of supplying high temperature oil and low temperature oil was 1 kg/cm$^2$, the oil temperature at the tank outlet in the period of supplying high temperature oil was 196° C. (measured value), and the oil temperature at the tank outlet in the period of supplying low temperature oil was about 40° C. (measured value).

Samples Nos. 1 to 8 were checked as to whether or not leakage occurred. The test results are summarized in Table 1 below.

TABLE 1

| | Size | |
|---|---|---|
| | φ 8 mm | φ 19 mm |
| | | Initial fastening |
| | Hand fastening and 1/2 turn | Hand fastening and 1/2 turn |
| | | Sample No. |
| Cycle | Nos. 5 to 8 | Nos. 1 to 4 |
| 1 | Ne leakage | No leakage |
| 2 to 99 | No leakage in these cycles | No leakage in these cycles |
| 100 | No leakage | No leakage |

As a result of the heat cycle test, it was found that, in a case where the fastening was conducted by a combination of the initial fastening and a further fastening of ½ turn using a spanner or the like, samples Nos. 1 to 4 and Nos. 5 to 8 are free from leakage and can exhibit excellent sealing properties even when the process of alternatingly and circularly supplying silicone oil of a high temperature and that of an ordinary temperature is repeated 100 cycles. From the test results, it will be noted that, when the pipe joint is connected to the quartz pipe 7 of a pipe diameter of 19 or 8 mm, a leakage of the transporting fluid can surely be prevented from occurring only by the fastening operation in which the first and second nuts 2 and 5 are turned by hand and then turned by ½ turn using a spanner or the like. From the above, it can be said that the quartz pipe joint A has an excellent workability when it is to be connected to the quartz pipe 7 or a synthetic resin tube.

Further, samples Nos. 1 to 8 were checked whether or not the quartz pipes 7 slipped out. As a result, none of the quartz pipes 7 slipped out. From this, it will be noted that, since the lock ring 4 is fittingly fixed to the annular groove 71 of each quartz pipe 7, the quartz pipes 7 are prevented from slipping out even when sample Nos. 1 to 8 are subjected to high pressure and high temperature, so that a pipe holding force of a high level which exceeds the breaking strength of the quartz pipes 7 themselves can be attained. Further, it was found that, since the quartz pipe 7 is made of a material which is difficult to be adversely affected by a variation of the fluid pressure or the fluid temperature, the maximum allowable working temperature (200° C.) and the maximum allowable working pressure (normally, 2 kg/cm$^2$) are remarkably improved and the application range of a pipe joint can be extended.

Figure 3:
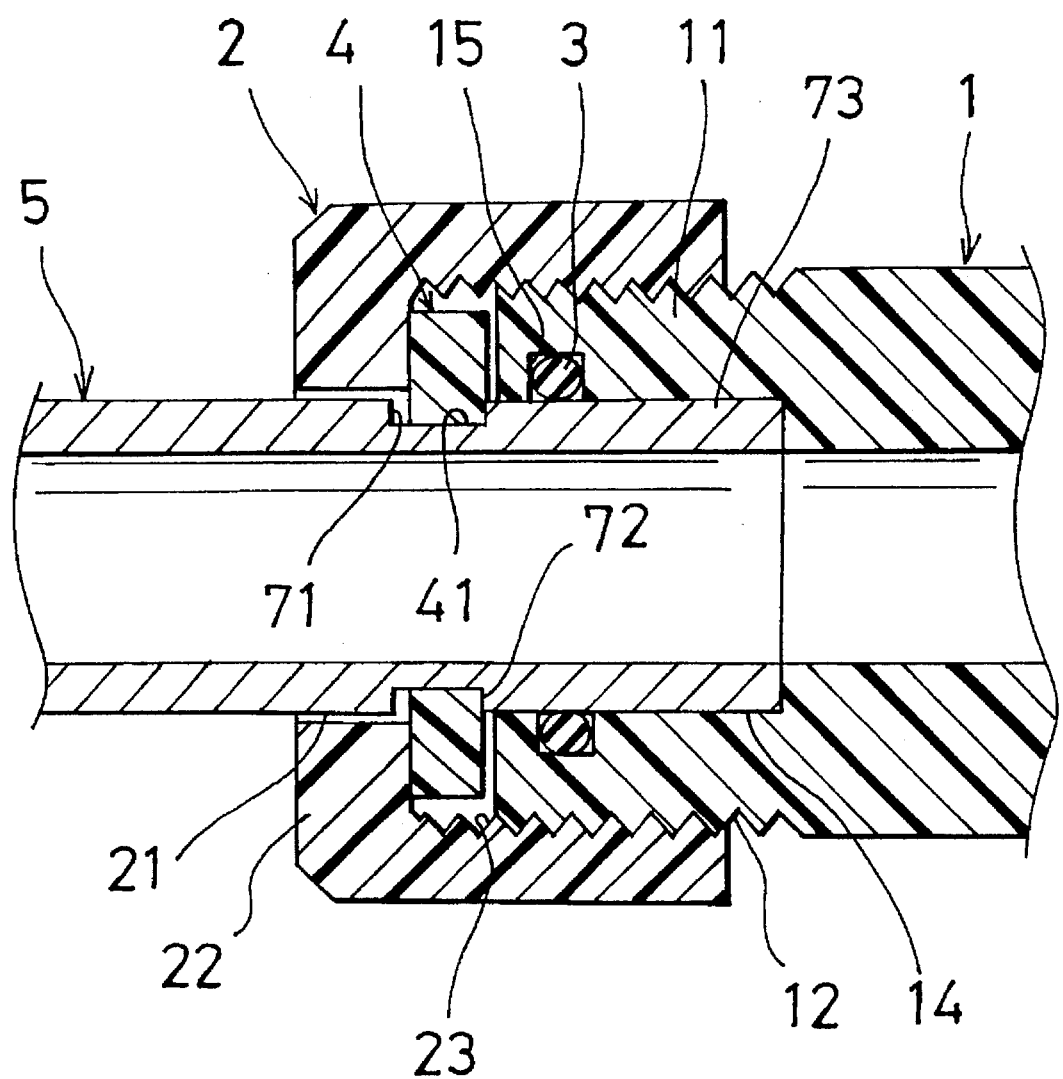
FIG. 3 is a vertical section view showing a use state of a quartz pipe joint according to another embodiment.

In the quartz pipe joint A of FIG. 3 according to another embodiment, in place of the sealing member 3 shown in FIGS. 1 and 2, an O-ring made of a fluororesin is used as the sealing member 3. In the quartz pipe joint A, a groove 15 is engraved on the inner peripheral face of the insertion recess 14 of the pipe receiving portion 11 in the one end side of the joint body 1. The sealing member 3 consisting of the O-ring is fitted into the groove 15, and the end 73 of the quartz pipe 7 is then inserted into the insertion recess 14, so that the sealing member 3 closely contacts with the outer peripheral face of the quartz pipe 7 in an air-tight or liquid-tight manner, thereby accomplishing a seal. The slipping-out preventing function, etc. exerted by the lock ring 4 are the same as those of the quartz pipe joint A shown in FIGS. 1 and 2. In FIG. 3, therefore, portions identical with or corresponding to those shown in FIGS. 1 and 2 are designated by the same reference numerals, and their detailed description is omitted.

Figure 4:
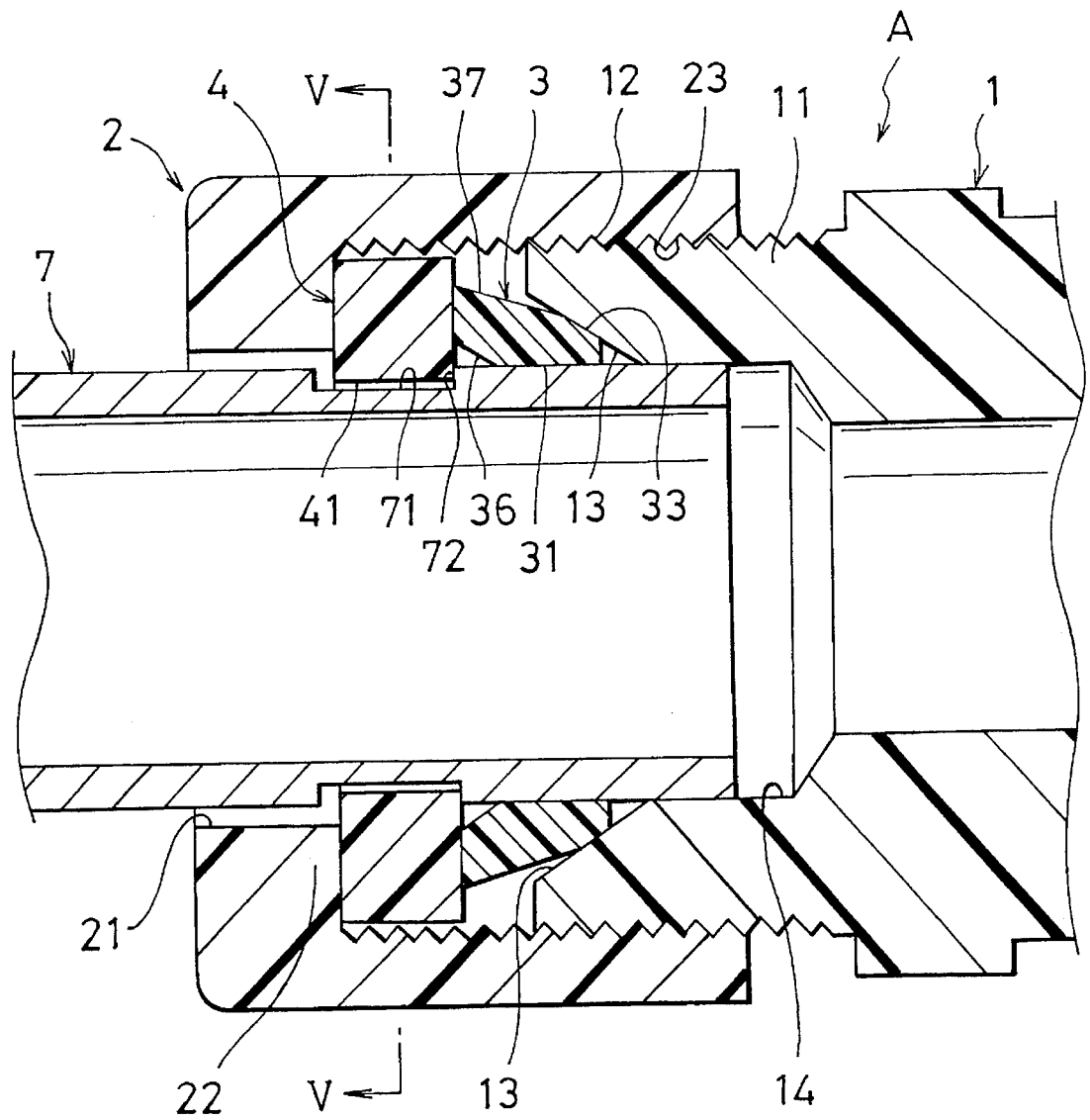
FIG. 4 is a vertical section view showing a use state of a quartz pipe joint according to a further embodiment.
Figure 6:
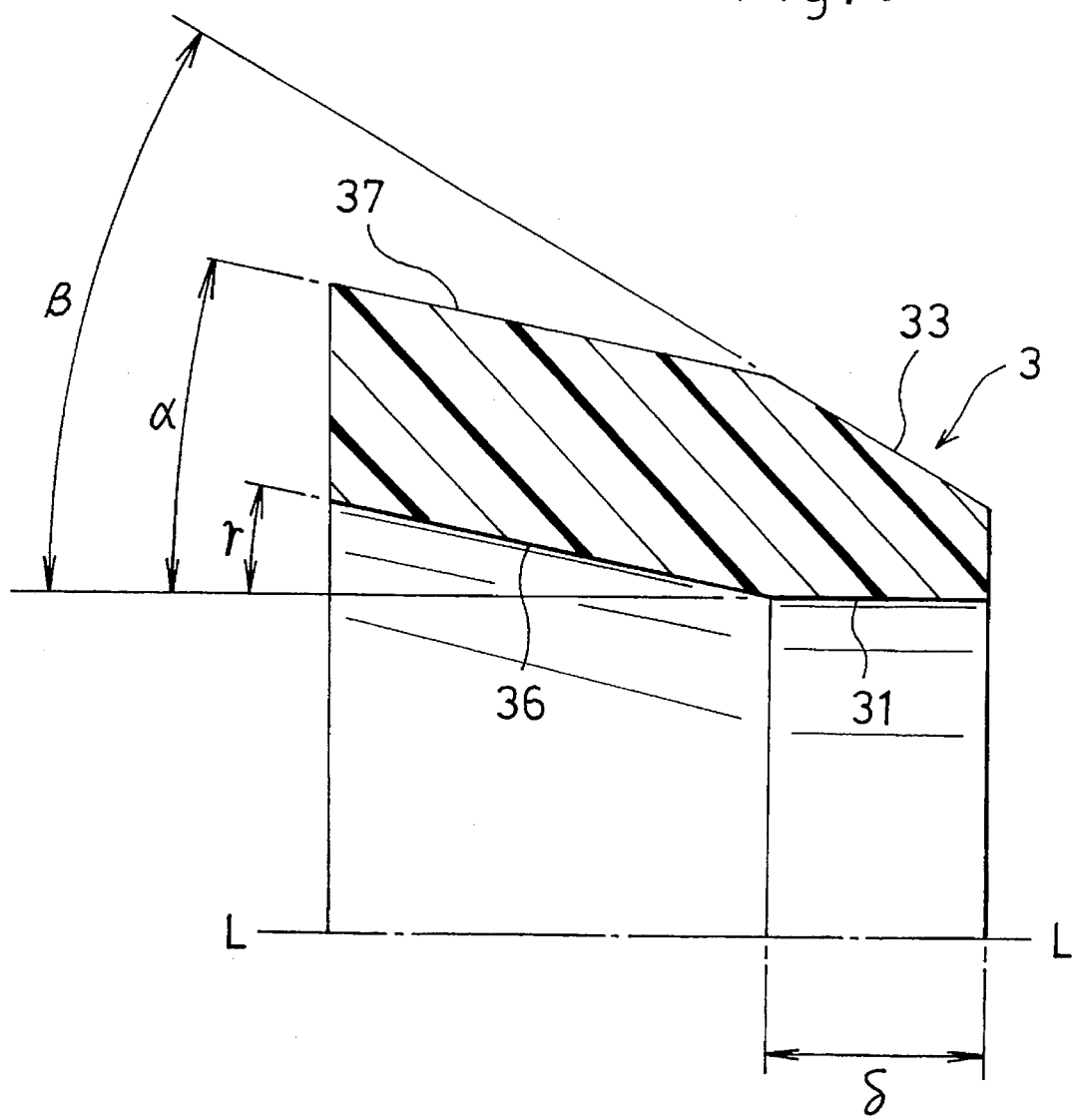
FIG. 6 is an enlarged vertical section view showing a part of a sealing member which is use in the quartz pipe joint of FIG. 4.

In the quartz pipe joint A of FIG. 4 according to a further embodiment, the structure of the sealing member 3 is different from that employed in the quartz pipe joint A shown in FIGS. 1 and 2. As shown in FIG. 6 in an enlarged manner, the sealing member 3 used in the quartz pipe joint A of the embodiment is identical with the sealing member 3 of the quartz pipe joint A shown in FIGS. 1 and 2, in that the inner peripheral face 31 is a cylindrical face and the tapered receiving face 33 is formed at one end face. However, the sealing member 3 in this embodiment is different from the sealing member 3 of the quartz pipe joint A shown in FIGS. 1 and 2, in that the inner periphery portion of the other end face is formed as an outwardly expanding tapered face 36 and the outwardly expanding tapered face 36 elongates deeply into the sealing member 3, and that the outer peripheral face 37 is formed as a tapered face in which the inclination angle with respect to the axis L-L is smaller than that of the receiving face 33, its diameter is gradually reduced toward the receiving face 33, and the smallest-diameter portion contacts with the receiving face 33.

As shown in FIG. 4, in the state where the quartz pipe joint A and the quartz pipe 7 are connected to each other, the sealing member 3 and the lock ring 4 are clamped in the axial direction by the pressing face 13 of the joint body 1 and the pressing piece 22 of the first nut 2 threadedly connected to the joint body 1. Since the inner periphery portion of the other end face of the sealing member 3 is formed as the outwardly expanding tapered face 36, the outwardly expanding tapered face 36 surrounds the groove wall 72 of the annular groove 71 of the quartz pipe 7. Consequently, the cylindrical face (inner peripheral face) 31 of the sealing member 3 closely contacts with the outer peripheral face of the quartz pipe 7 at a position which is slightly separated from the annular groove 71 of the quartz pipe 7.

In the configuration wherein the cylindrical face 31 of the sealing member 3 closely contacts with the outer peripheral face of the quartz pipe 7 at a position which is slightly separated from the annular groove 71 of the quartz pipe 7, even when the quartz pipe 7 is tightly fastened by the sealing member 3 which is deformed to reduce its diameter, the stress concentration due to the fastening is hardly generated in the location where the annular groove 71 is formed. Therefore, the possibility of breaking the quartz pipe 7 is reduced even in the case where the inner peripheral face 31 of the sealing member 3 is closely contacted with the outer peripheral face of the quartz pipe 7 to enhance the sealing properties by threadedly connecting the first nut 2 to the joint body 1 and tightly fastening it. Since the outwardly expanding tapered face 36 elongates to the inside of the sealing member 3, the length of the inner peripheral face 31 in the axial direction is reduced by the length of the elongation, so that the area of the portion of the inner peripheral face 31 contacting with the outer peripheral face of the quartz pipe 7 is reduced as compared with that in the case of FIG. 2. When the level of the fastening force applied to the first nut 2 is equal to that in the case of FIG. 2, therefore, the contact pressure which is exerted onto the outer peripheral face of the quartz pipe 7 by the sealing member 3 is greater than that in the case of FIG. 2. In other words, a contact pressure equal to that in the case of FIG. 2 can be obtained by applying a smaller fastening force. Although the sealing properties of the sealing member 3 are not impaired even when the fastening force is small, accordingly, the possibility of breaking the quartz pipe 7 is reduced. Further, it was found that the structure wherein the sealing member 3 is provided with the outwardly expanding tapered face 36 and the outer peripheral face 37 is formed as a tapered face in which the inclination angle with respect to the axis is smaller than that of the receiving face 33, its diameter is gradually reduced toward the receiving face 33, and the smallest-diameter portion contacts with the receiving face 33 causes the sealing member 3 to be easily deformed to reduce its diameter when the receiving face 33 is pushed against the pressing face 13 of the joint body 1.

If the tapered outer peripheral face 37 formed on the outer peripheral face of the sealing member 3 has an inclination angle $\alpha$ with respect to the axis L-L, and the tapered receiving face 33 of the sealing member 3 has an inclination angle $\beta$ with respect to the axis L-L, it was found that the susceptibility of diameter-reduction deformation of the sealing member 3 is made proper when the following relationship is satisfied:

$$3° < \beta - \alpha < 10° \tag{1}$$

Further, if the inclination angle of the other end internal face of the sealing member with respect to the axis of the tapered face is indicated by $\gamma$, it was found that the susceptibility of diameter-reduction deformation of the sealing member 3 is made further preferable when the following relationship is satisfied in addition to the relationship (1):

$$3° < \gamma < 10° \tag{2}$$

If the length of the inner peripheral face 31 in the axial direction which consists of the cylindrical face of the sealing member 3 is indicated by $\delta$, it was found that, when the following relationship is satisfied:

$$0.5 \text{ mm} < \delta < 5 \text{ mm} \tag{3}$$

a contact pressure comparable to that in the case of FIG. 1 can be obtained by a small fastening force exerted by the first nut 2 to maintain excellent sealing properties and the destruction of the quartz pipe 7 due to the stress concentration in the annular groove 71 of the quartz pipe 7 does not occur. In the case where $\delta$ is 0 or the outwardly expanding tapered face 36 elongates over the whole length of the sealing member 3, when the nut 2 is fastened, only the inner periphery portion of one end face of the sealing member 3 collapses so that the sealing properties are liable to become incomplete. In the case where $\delta$ is greater than 5 mm, it is difficult to obtain a contact pressure comparable to that in the case of FIG. 1 by a small fastening force. If $\delta$ is within the above-mentioned range, the sealing function is hardly impaired even when the force becomes excessive.

Figure 5:
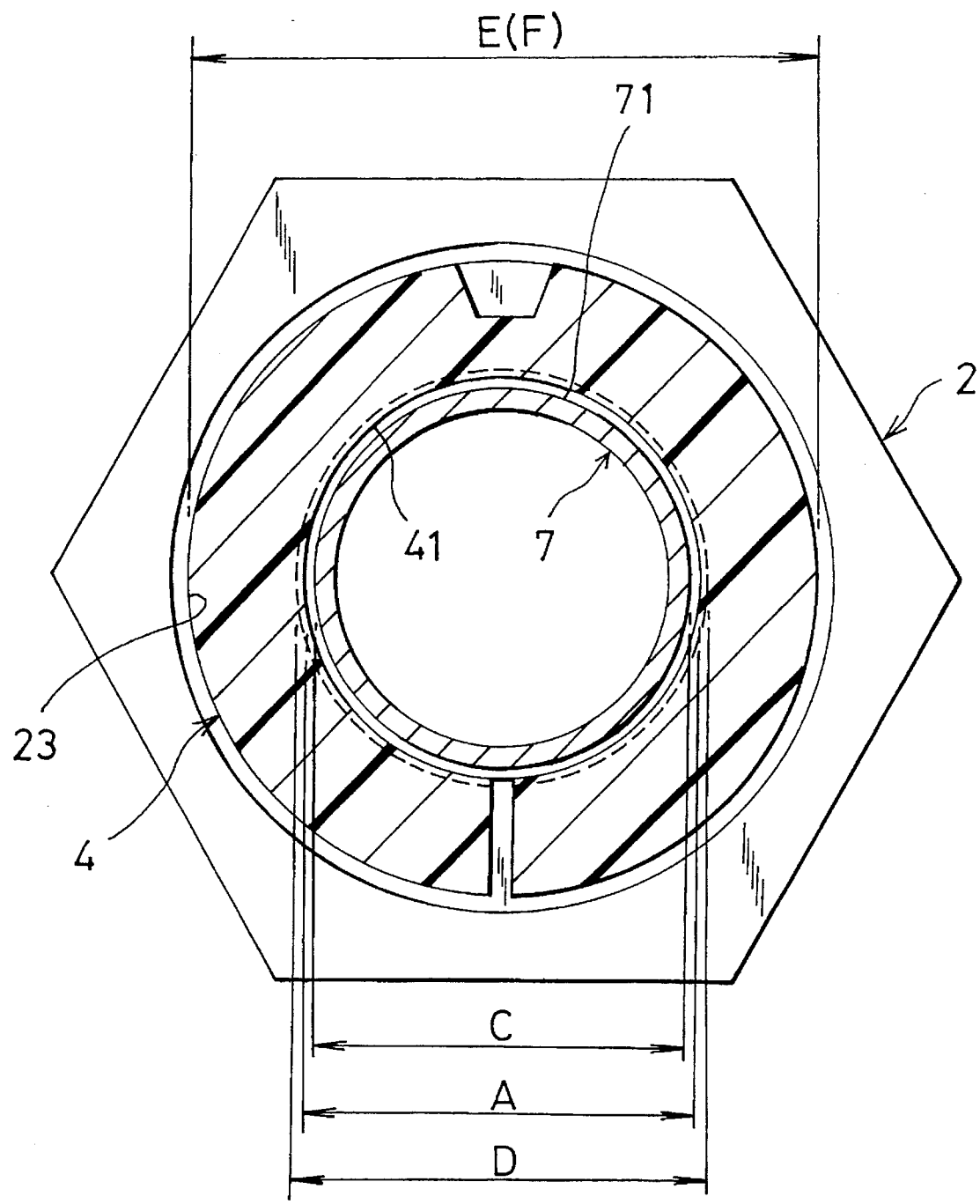
FIG. 5 is a vertical section view taken along line V—V of FIG. 4.

In the quartz pipe joint A of FIG. 4, If, as shown in FIG. 5, the inner diameter of the lock ring 4 is indicated by A, the outer diameter of the bottom face of the annular groove 71 of the quartz pipe 7 is indicated by C, and the outer diameter of the quartz pipe is indicated by D, the following relationship is satisfied:

$$C < A < D \tag{4}$$

Therefore, the lock ring 4 fitted into the annular groove 71 of the quartz pipe 7 is always kept to be the natural state (no-load state) whether or not the nut 2 is threadedly connected to the joint body 1. This completely eliminates the possibility that the lock ring 4 fastens the quartz pipe 7 to generate the stress concentration in the location where the annular groove 71 is formed.

If the inner diameter of the nut 2 is indicated by E, and the outer diameter of the lock ring 4 is indicated by F, when the conditions that F is not greater than E and E and F are substantially equal to each other are satisfied in addition to the above relationship (4), the first nut 2 can be externally fitted onto the lock ring 4 in the natural state, under the state in which the nut does not largely jolt or is free from jolting. In this state, the lock ring 4 is kept to be disabled from deforming to increase its diameter. If the first nut 2 is externally fitted onto the lock ring 4 fitted into the annular groove 71, therefore, the lock ring 4 cannot deform to increase its diameter even when the first nut 2 has not yet been threadedly connected to the joint body 1, so that the lock ring 4 is prevented from accidentally slipping out from the quartz pipe 7. This function is exerted also in the quartz pipe joint A shown in FIGS. 1 and 2.

It is apparent that, in the quartz pipe joint A shown in FIG. 4, the functions including the slipping-out preventing function exerted by the lock ring 4 are performed in the same manner as those of the quartz pipe joint A shown in FIGS. 1 and 2. In FIGS. 4 to 6, therefore, portions identical with or corresponding to those shown in FIGS. 1 and 2 are designated by the same reference numerals, and their detailed description is omitted.

Figure 7:
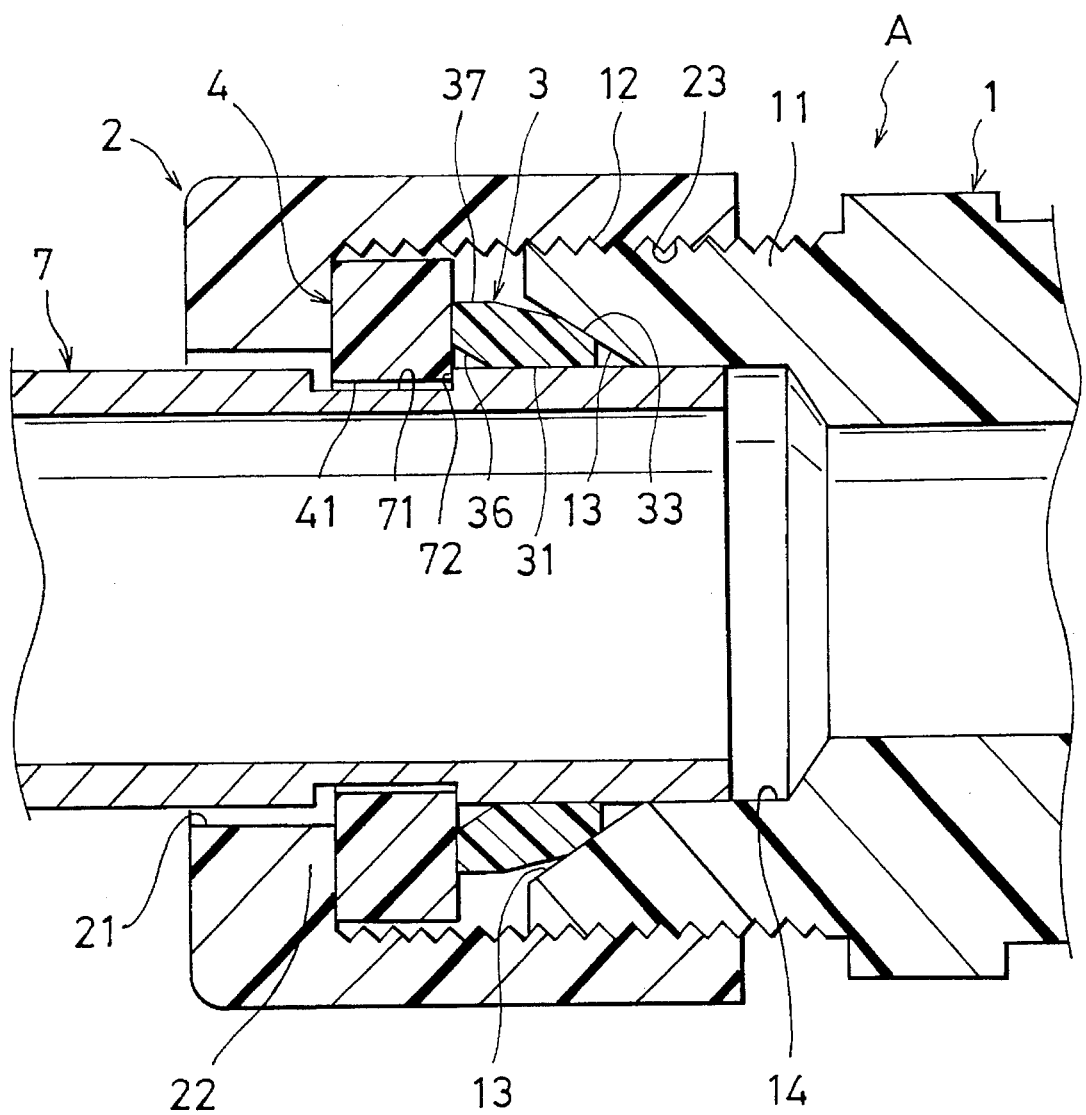
FIG. 7 is a vertical section view showing a use state of a quartz pipe joint according to a still further embodiment.

In the quartz pipe joint A of FIG. 7 according to a still further embodiment, the structure of the sealing member 3 is different from that employed in the quartz pipe joint A shown in FIG. 4. In the sealing member 3 used in the quartz pipe joint A of the embodiment, the outer peripheral face 37 is formed as a cylindrical face which is parallel to the inner peripheral face 31 formed as a cylindrical face. The other configuration and functions are the same as those of the quartz pipe joints A shown in FIGS. 1, 2, and 4, and other figures. In FIG. 7, therefore, portions identical with or corresponding to those shown in FIGS. 1, 2, 4, 5, and 6 are designated by the same reference numerals, and their detailed description is omitted.

Figure 8:
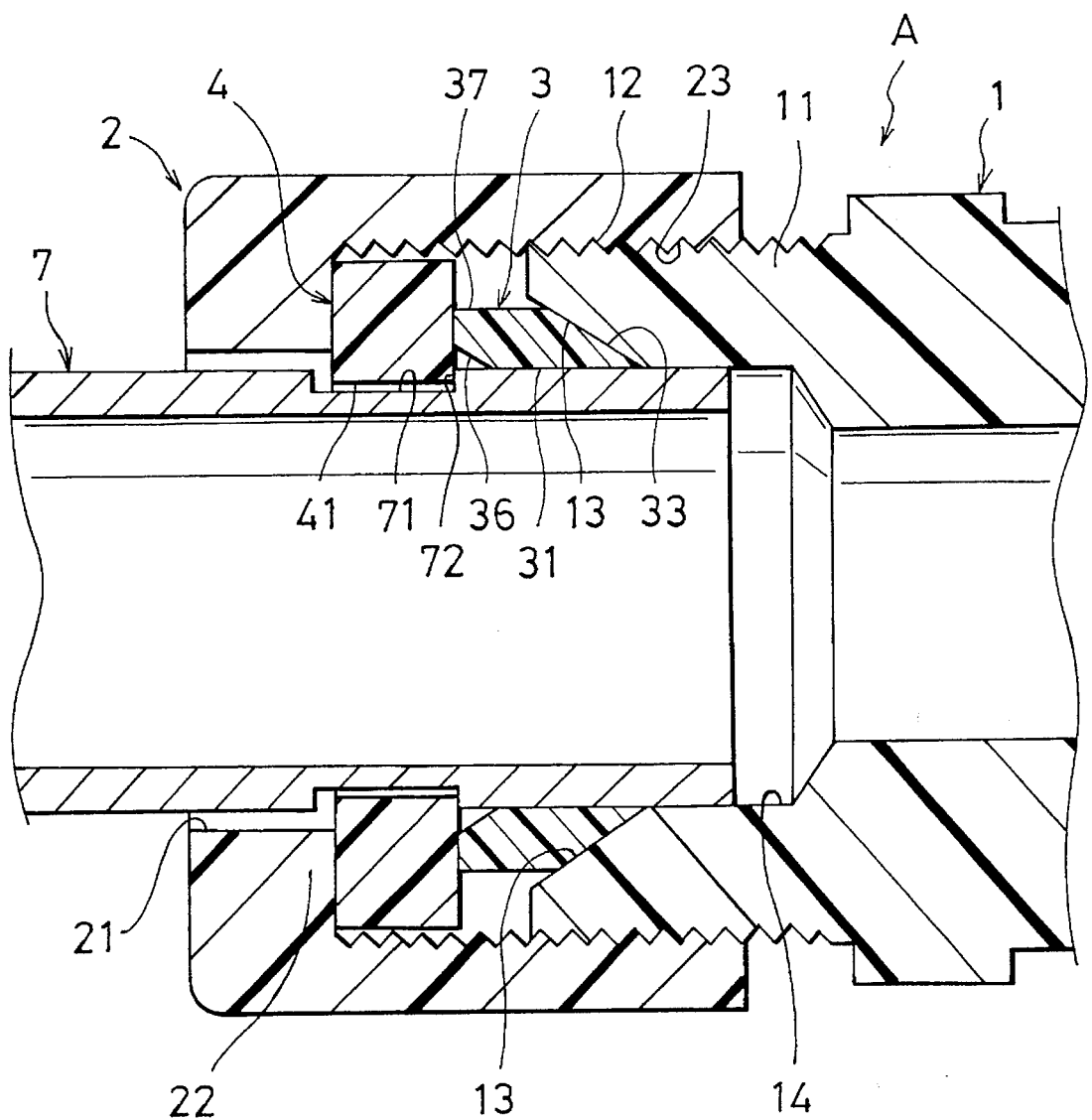
FIG. 8 is a vertical section view showing a use state of a quartz pipe joint according to a still further embodiment.

In the quartz pipe joint A of FIG. 8 according to a fifth embodiment, the structure of the sealing member 3 is different from that employed in the quartz pipe joint A shown in FIG. 4. In the sealing member 3 used in the quartz pipe joint A of the embodiment, the whole length of the outer peripheral face 37 is formed as a cylindrical face which is parallel to the inner peripheral face 31 formed as a cylindrical face. Therefore, the sealing member 3 used in the embodiment of FIG. 8 is not provided with the tapered outer peripheral face 37 which is shown in FIG. 6 in an enlarged manner. The other configuration and functions are the same as those of the quartz pipe joints A hitherto described. In FIG. 8, therefore, portions identical with or corresponding to those shown in FIGS. 1, 2, 4, 5, and 6 are designated by the same reference numerals, and their detailed description is omitted.

In the quartz pipe joints A of the embodiments which have been described, the structure and material of the elements such as joint body 1, the first nut 2, and the lock ring 4, and the procedure of connecting the pipe joint to the quartz pipe 7 are the same as those described in conjunction with FIGS. 1 and 2. Further, the slipping-out preventing function exerted when the pipe joint is connected to the quartz pipe 7 is performed in the same manner in the embodiments.

The quartz pipe joint of the invention is not restricted to the configurations of the above-mentioned embodiments, and necessary modification can freely be conducted within the range in which the function and effects of the present invention are not impaired. The quartz pipe joint of the present invention may be used to connect a quartz pipe to another quartz pipe.

What is claimed is:

1. A quartz pipe joint, comprising:
   a joint body having a pipe receiving portion into which a quartz pipe is to be inserted, the quartz pipe having an outer peripheral face and an annular groove formed in the outer periphery;
   a cylindrical sealing member to be externally fitted onto the quartz pipe, said cylindrical sealing member having an inner peripheral face, one end face and another end face, said fitting causing said inner peripheral face and said sealing member to closely contact with the outer peripheral face of the quartz pipe;
   a tapered receiving face formed on said one end of said sealing member which has a diameter gradually decreasing toward a front end of said one end of said sealing member;
   an outwardly extending tapered pressing face disposed in said pipe receiving portion of said joint body, said pressing face overlapping said receiving face of said sealing member;
   a lock ring deformable to increase its diameter and reduce its diameter, said lock ring being fitted into the annular groove formed on the outer periphery of the quartz pipe at a predetermined location in an axial direction, an inner periphery portion of said lock ring being engageable in the axial direction with a groove wall of the annular groove under a state in which said ring is fitted into the annular groove;
   a nut to be externally fitted onto the quartz pipe and threadedly connected to said joint body;
   a pressing piece which is disposed in said nut, said pressing piece cooperating with said pressing face to, when said nut is threadedly connected to said joint body, clamp said lock ring which is fitted into the annular groove of the quartz pipe, and said sealing member which is externally fitted onto the quartz pipe; and
   an outwardly extending tapered face which is formed on an inner peripheral portion of said other end face of said sealing member, said outwardly extending tapered face extending around the groove wall of the annular groove of the quartz pipe when said sealing member is clamped together with said lock ring by said pressing face of said joint body and said pressing piece of said nut, whereby the inner peripheral face of said sealing member is closely contacted with the outer peripheral face of the quartz pipe at a position which is separated from the annular groove.

2. A quartz pipe joint according to claim 1, wherein said inner peripheral face of said sealing member is a cylindrical face.

3. A quartz pipe joint according to claim 1, wherein an outer peripheral face of said sealing member is tapered in which an inclination angle with respect to a horizontal axis is smaller than that of said tapered receiving face of said sealing member, its diameter of said outer peripheral tapered face is gradually reduced toward said receiving face, and the smallest-diameter portion of said outer peripheral tapered face contacts with said receiving face.

4. A quartz pipe joint according to claim 3, wherein, when an inclination angle of said tapered outer peripheral face is indicated by $\alpha$, and an inclination angle of said tapered receiving face is indicated by $\beta$, the relationship:

$$3° < \beta - \alpha < 10°$$

is satisfied.

5. A quartz pipe joint according to claim 3, wherein, when an inclination angle of said tapered outer peripheral face is indicated by $\alpha$, an inclination angle of said tapered receiving face is indicated by $\beta$, and an inclination angle of said outwardly extending tapered face is indicated by $\gamma$, the relationships $$3° < \beta - \alpha < 10°, \text{ and}$$

$$3° < \gamma < 10°$$

are satisfied.

6. A quartz pipe joint according to claim 3, wherein, when a length of said inner peripheral face of said sealing member in the axial direction is indicated by $\delta$, the relationship:

$$0.5 \text{ mm} < \delta < 5 \text{ mm}$$

is satisfied.

7. A quartz pipe joint, comprising:
   a joint body having a pipe receiving portion into which a quartz pipe is inserted, the quartz pipe having an outer peripheral face and an annular groove formed in the outer periphery;
   a ring-like sealing member held at said pipe receiving portion of said joint body, said ring-like sealing member being closely contacted with the outer peripheral face of the quartz pipe;
   a lock ring deformable to increase its diameter and reduce its diameter, said lock ring being fitted into the annular groove formed on the outer periphery of the quartz pipe at a predetermined location in an axial direction, an inner periphery portion of said lock ring being engageable in the axial direction with a groove wall of the annular groove under a state in which said ring is fitted into the annular groove;
   a nut to be externally fitted onto the quartz pipe and threadedly connected to said joint body; and
   a pressing piece which is disposed in said nut, said pressing piece cooperating with said pressing face to, when said nut is threadedly connected to said joint body, clamp said lock ring in the axial direction.

* * * * *

UNITED STATES PATENT AND TRADEMARK OFFICE
CERTIFICATE OF CORRECTION

PATENT NO. : 5,516,159
DATED : May 14, 1996
INVENTOR(S) : Nobuhito Hirakawa et al It is certified that error appears in the above-indentified patent and that said Letters Patent is hereby corrected as shown below:

Claim 3, column 14, line 8, "its" should be "the".

Signed and Sealed this

Twenty-seventh Day of August, 1996

Attest:

BRUCE LEHMAN

Attesting Officer     Commissioner of Patents and Trademarks